United States Patent
Kotlarski (12)

(10) Patent No.: US 6,718,594 B1
(45) Date of Patent: Apr. 13, 2004

(54) WIPING DEVICE FOR THE GLASS SURFACES OF MOTOR VEHICLES, COMPRISING A WIPING ARM THAT CAN BE MOVED BETWEEN REVERSIBLE POSITIONS AND THAT IS LOADED TOWARDS THE GLASS SURFACE

(75) Inventor: Thomas Kotlarski, Bad Neuennahr (DE)

(73) Assignee: Robert Bosch GmbH, Stuttgart (DE)

( * ) Notice: Subject to any disclaimer, the term of this patent is extended or adjusted under 35 U.S.C. 154(b) by 268 days.

(21) Appl. No.: 09/806,097

(22) PCT Filed: Jul. 1, 2000

(86) PCT No.: PCT/DE00/02150

§ 371 (c)(1),
(2), (4) Date: Mar. 26, 2001

(87) PCT Pub. No.: WO01/08950

PCT Pub. Date: Feb. 8, 2001

(30) Foreign Application Priority Data

Jul. 30, 1999 (DE) .......................................... 199 35 861

(51) Int. Cl.$^7$ ................................................ B60S 1/40
(52) U.S. Cl. .................................................. 15/250.32
(58) Field of Search ...................... 15/250.32, 250.351, 15/250.31, 250.19

(56) References Cited

U.S. PATENT DOCUMENTS

| | | | | |
|---|---|---|---|---|
| 3,163,877 A | * | 1/1965 | Wubbe .................... | 15/250.32 |
| 4,300,259 A | | 11/1981 | Maiocco .................. | 15/250.32 |
| 4,348,782 A | * | 9/1982 | Fournier .................. | 15/250.32 |
| 4,670,934 A | * | 6/1987 | Epple et al. ............. | 15/250.32 |
| 5,636,407 A | | 6/1997 | Len ......................... | 15/250.32 |
| 6,353,962 B1 | * | 3/2002 | Matsumoto et al. ..... | 15/250.32 |

FOREIGN PATENT DOCUMENTS

| | | |
|---|---|---|
| DE | 1 905 352 | 9/1969 |
| DE | 197 29 862 A1 | 1/1999 |
| DE | 197 29 865 A | 1/1999 |
| GB | 2 238 953 A | 6/1991 |

\* cited by examiner

Primary Examiner—Gary K. Graham
(74) Attorney, Agent, or Firm—Michael J. Striker

(57) ABSTRACT

A wiper apparatus for motor vehicle windows is proposed, having a wiper arm (12) that can be moved between reversal positions, is loaded toward the window (20), and constitutes a first apparatus part. The free end of the wiper arm is connected to a wiper blade (16), which can pivot around an axis (40) pointing essentially in the wiping direction (double arrow 38), constitutes a second apparatus part, and together with the wiper arm, can be moved lateral to the wiping direction, from its operating position into an installation position, wherein the wiper blade is provided with two bearing pins (44), which are part of the hinge joint (40), protrude from the longitudinal sides of the wiper blade, are flush with each other, are noncircular in cross section, and are guided in recesses (46) of the wiper arm (12) that are open at the edge, and is provided with means for limiting pivoting motion. An optically inconspicuous, inexpensive design of the wiper apparatus is achieved if the wiper blade (16) is disposed next to the wiper arm (12) when viewed from above and if at least one of the two apparatus parts (12 and 16) is provided with stops (70 and 72), which are disposed at a distance (68) from each other in the pivoting direction (double arrow 42), extend toward the other apparatus part (16 and 12), and cooperate with counterpart stops (72 or 70) there, and thereby limit the pivoting motion of the wiper blade (16) in relation to the wiper arm (12) to a maximal amount of 45°.

6 Claims, 2 Drawing Sheets

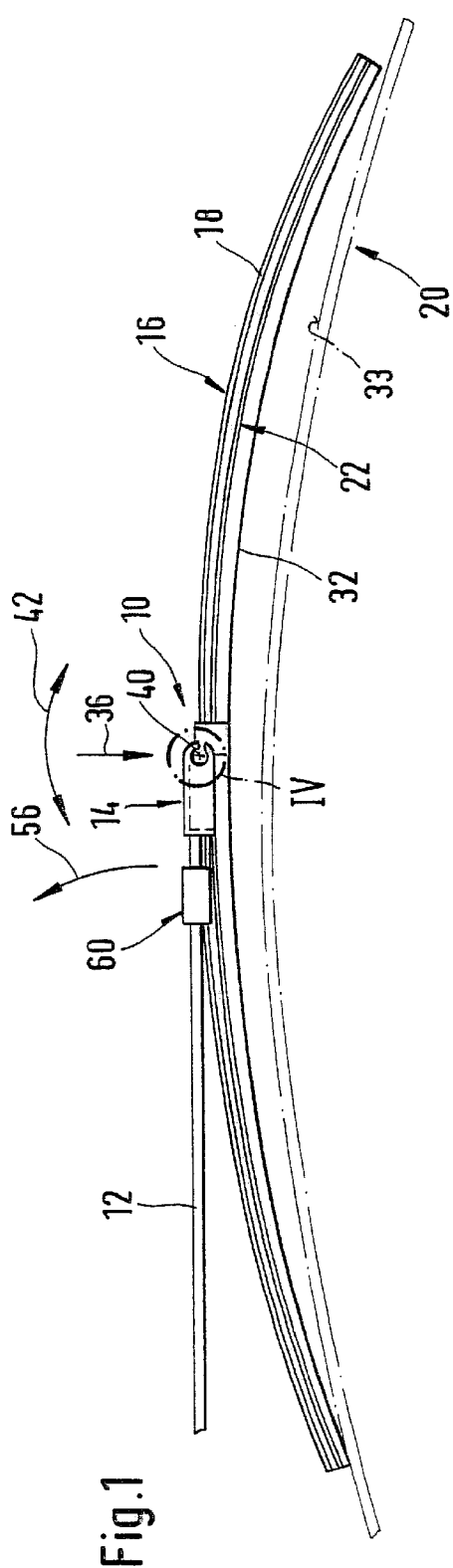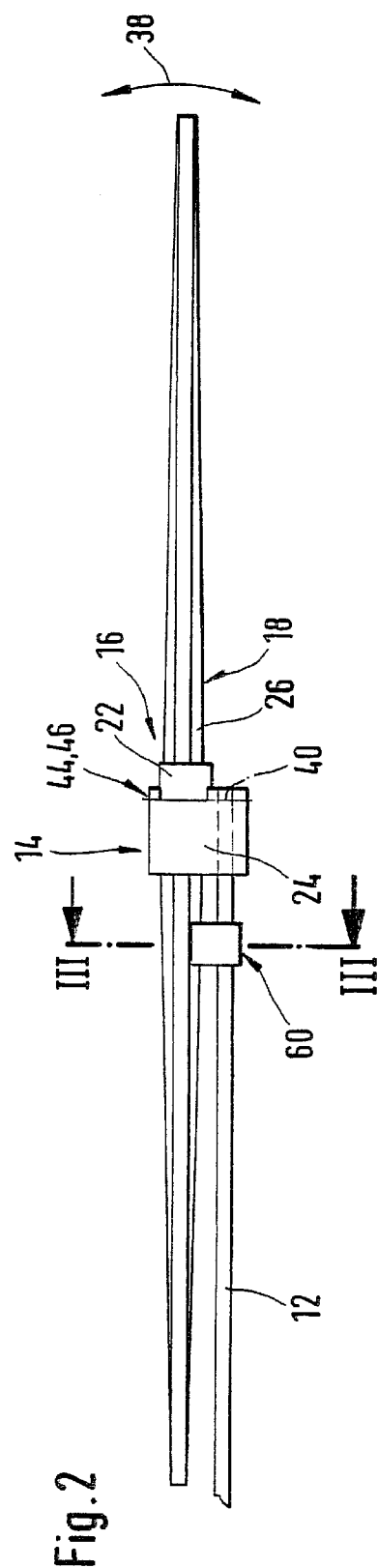

WIPING DEVICE FOR THE GLASS SURFACES OF MOTOR VEHICLES, COMPRISING A WIPING ARM THAT CAN BE MOVED BETWEEN REVERSIBLE POSITIONS AND THAT IS LOADED TOWARDS THE GLASS SURFACE

BACKGROUND OF THE INVENTION

In wiper apparatuses limiting the necessary pivoting motion lateral to the wiping direction in a particular installation position when the wiper blade is lifted up from the window along with the wiper arm, should prevent the wiper blade from moving—due to improper handling—around the pivot axis until its bearing pins automatically travel through the opening of the bearing recesses. As a result of this, the wiper blade can unintentionally come loose from the wiper arm, fall off, and damage the finish of the vehicle, for example.

The invention is based on a wiper apparatus. In a known wiper apparatus (DE 19 053 52 A1) that is, however, embodied differently with regard to the pivoting support, the free end of the wiper arm is inserted between the spaced-apart side walls of a support frame associated with the wiper blade, in which button-like support projections pointing toward one another protrude from the inside walls that are oriented toward each other; after installation of the wiper blade on the wiper arm, these support projections can be moved in oblong holes which are provided in guide walls of the wiper arm and whose length limits the pivoting motion. In order to realize the limiting means, the solution to the problem explained at the beginning consequently requires particular design features both in the wiper blade (support frame side walls) and in the wiper arm (placement between the side walls).

SUMMARY OF THE INVENTION

In the wiper apparatus according to the invention, the embodiment of the wipe blade and wiper arm is irrelevant because the placement of the wiper blade and wiper arm next to each other permits an optically inconspicuous, inexpensively designed placement of the stops and counterpart stops on the two parts of the apparatus.

In a practical manner, the stops are disposed on the wiper arm and the counterpart stops are disposed on the wiper blade.

A particularly simple design of the wiper apparatus according to the invention is produced if two tabs are disposed on the wiper arm, which extend toward the wiper blade, constitute stops, and extend in the pivoting plane of the wiper blade at a distance from the window and if in addition, the distance between the tab surfaces oriented toward each other is greater than the distance between the counterpart stops of the wiper blade, which are disposed on the wiper blade, between the tabs.

Another simplification of the wiping process is achieved if the wiper blade is provided with a band-like, elongated, spring elastic support element, which is spaced apart from the window to be wiped and is provided for a rubber elastic wiper strip that can be placed against the window; the support element extends with a projection beyond the width of the wiper strip, between the surfaces of the tabs that are oriented toward each other and lastly, if the counterpart stops of the wiper blade are embodied on the projection.

A particularly inexpensive, easy-to-assemble possibility for the tab placement is produced if these two tabs are constituted by extensions of the arms of a clamp with a U-shaped cross section, which encompasses the wiper arm and is fastened to it.

In order to prevent the clamp from moving in the longitudinal direction of the wiper arm, it is advantageous if it has a securing shoulder pointing in the longitudinal direction of the wiper arm, which shoulder cooperates with a counterpart shoulder of the wiper arm that is oriented toward it.

If the clamp is made of an elastic plastic, this permits the clamp to be mounted on the wiper arm in a simple way.

Other advantageous improvements and embodiments of the invention will be disclosed in the following description of an exemplary embodiment shown in the accompanying drawings.

BRIEF DESCRIPTION OF THE DRAWINGS

FIG. 1 is a side view of a wiper apparatus with a wiper blade and a wiper arm,

FIG. 2 is a top view of the apparatus according to FIG. 1,

DESCRIPTION OF THE PREFERRED EMBODIMENTS

Figure 3:
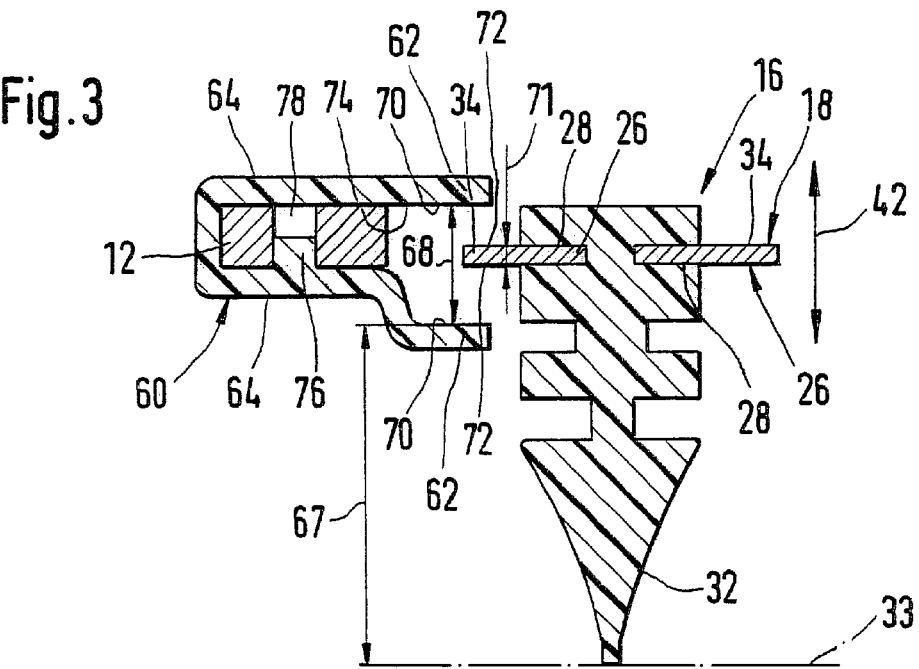
FIG. 3 shows the sectional plane of a section through the wiper apparatus along the line III—III in FIG. 2, in an enlarged depiction that is rotated by 90°.

A wiper apparatus 10 shown in FIGS. 1 and 2 has a driven wiper arm 12 that can be moved between two reversal points, whose free end is detachably connected to a wiper blade 16 by means of a connecting device 14. The wiper blade has a band-like, elongated, spring elastic support element 18 and the wiper blade part 22 of the connecting device 14 is disposed on the band surface of this support element 18 oriented away from the window 20 to be wiped, in the middle section of the wiper blade. The other wiper arm part 24 of the connecting device 14 is connected to the free end of the wiper arm 12. As shown in FIG. 3, the support element 18 has two elongated, spring elastic strips 26 which respectively rest in longitudinal grooves 28 on the sides of a rubber elastic wiper strip 30, which has a wiper lip 32 and can be placed against the surface 33 of the window 20 to be wiped. Since the two longitudinal grooves 28 extend in a common plane, this produces the above-mentioned support element 18 to which the part 22 is fastened. This is possible because both spring strips 26 are wider than the depth of the longitudinal grooves 28. As a result, the spring strips 26 protrude with strip-like projections 34 from their longitudinal grooves 28. In spite of the support element used here, which has two separate spring strips, the invention can naturally also be realized with a one-piece support element. What is crucial is the disposition of the stops and the counterpart stops on the wiper arm and the wiper blade in a manner that correspondingly limits the pivoting of the blade in relation to the arm. The wiper arm 12 is loaded in the direction of the arrow 36 toward the window 20 so that during wiper operation, the wiper blade is properly placed with its wiper lip 32 against the window surface 33. Since the dot-and-dash line 34 in FIG. 1 is intended to depict the sharpest curvature of the window surface, it is clear that the curvature of the wiper blade 16, which is placed with only its two tips against the window, is sharper than the maximal window curvature. With the pressure (arrow 36), the wiper blade 16 rests with its wiper lip 32 against the window surface 33 over its entire length. As a result, a tension is produced in the band-like, spring elastic support element 18, which ensures a proper contact of the wiper strip 30 and the wiper lip 32 against the motor vehicle window 20 over their entire length. Because the window 20, which as a rule is spherically curved, does not represent a section of a sphere, the wiper blade 16 must be able to continuously adapt in relation to the wiper arm 12 to the shape of the window surface 33 during its wiping motion (double arrow 38 in FIG. 2) that extends lateral to the longitudinal span of the wiper blade. As a result, the connecting device 14 is simultaneously embodied as hinge joint between the wiper blade 16 and the wiper arm 12. The axis 40 of this hinge joint extends essentially in the wiping direction so that the wiper blade 16 can execute a pivoting movement in relation to the wiper arm 12 in accordance with the double arrow 42 (in FIG. 1), which always assures the necessary contact of the wiper blade with the window surface 33 over its entire length.

Figure 4:
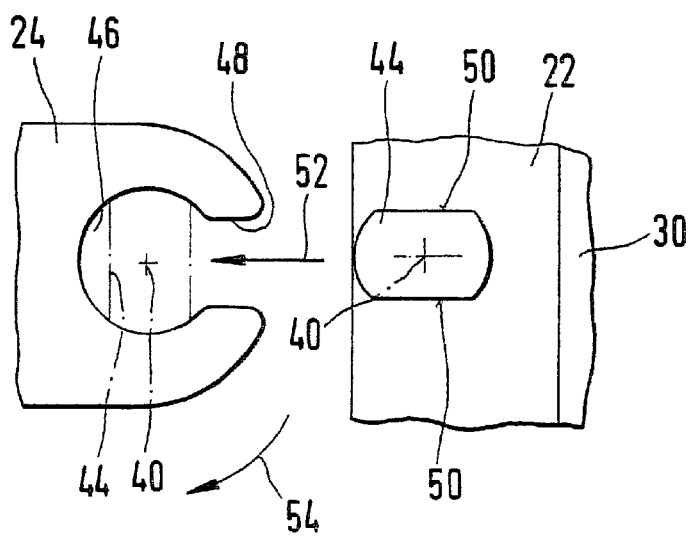
FIG. 4 shows a detail labeled IV in FIG. 1, in an enlarged depiction; however, the wiper blade is shown in a preinstallation position.

In order to permit a particularly low profile of the wiper apparatus above the window surface to be wiped, the wiper arm 12 is disposed next to the wiper blade 16 when viewed from the top or viewed perpendicular to the window, as shown in FIGS. 1 to 3. The design of the hinge joint between the wiper arm and the wiper blade only needs to be discussed here to the extent that this is necessary for comprehension of the invention, because hinge joints of this kind are known from the prior art—for example DE 197 29 862.1 A1. In the preinstallation position shown in an enlarged depiction in FIG. 4, between the wiper blade 16 and the wiper arm 12 and between the two apparatus parts 22 and 24 associated with the connecting device 14, in connection with FIG. 2, it is clear that the wiper blade is provided with two bearing pins 44, which are part of the hinge joint 40, protrude from the longitudinal sides of the wiper blade, are flush with each other, and are noncircular in cross section. According to the bearing position of the hinge pin 44 shown with dot-and-dash lines in FIG. 4, it is clear that these are guided in recesses 46 of the wiper arm or the wiper arm apparatus part 24 that are open at the edge. It is also clear that these insertion openings 48 for the recesses 46 are matched to the lower limit dimension produced by flattenings 50 of the bearing pins 44, while the circular recesses 46 coincide with the maximum limit of the bearing pins and correspond to their diameter. In order to produce the hinge joint between the wiper arm and the wiper blade, the wiper blade is inserted with its bearing pins 44 into the recesses 46 in accordance with the installation arrow 52 and is then rotated in the direction of the arrow 54 so that the wiper blade moves into its operating position; the attachment of the wiper blade on the wiper arm is assured by means of the particular embodiment of the bearing pins 44 in conjunction with the shape for the recesses 46. This installation process or the removal process—which is possible by means of a corresponding rotation of the wiper blade 16 in relation to the wiper arm 12—can only be achieved when the wiper arm is moved in the direction of the pivot arrow labeled 56 in FIG. 1, out of its operating position into an installation position. A securing device is disposed on the wiper arm so that when the wiper arm 12 provided with the wiper blade 16 is folded back from the window 20 in the direction of the arrow 56, the wiper blade cannot rotate uncontrollably in relation to the wiper arm and cannot become detached from it. In the exemplary embodiment, the securing device has a clamp 60, which is U-shaped in cross section (FIGS. 1 to 3), encompasses the wiper arm 12 on three sides lateral to its longitudinal span, and extends with tab-like extensions 62 of its U-arms 64 into the vicinity of a projection 66 of the spring strip 26 disposed adjacent to it. The two tabs 62 or their inner surfaces 70 oriented toward each other are disposed at a distance 67 from the window surface 33 to be wiped. The disposition and embodiment of the clamp 60 are conceived so that the projection 66 of the spring strip 26 rests between the surfaces 70 of the clamp tabs 62 that are oriented toward each other. The distance 68 between these surfaces 70 and the positioning of the clamp 60 on the wiper arm 12 must be dimensioned so that the wiper blade 16 can execute only a limited pivoting motion (double arrow 42) around the pivot axis 40 in relation to the wiper arm 12. This remaining permissible pivoting motion and the remaining permissible pivot angle are limited to a maximal amount of 45°. On the inner surfaces 70 of the tab-like projections 62 oriented toward each other and also the band surfaces 72 of the projection 66 of the one spring strip 26 oriented toward these inner surfaces, the securing device is consequently comprised of stops 70 and 72 disposed so that they extend from one part 12 of the wiper apparatus 10 toward the other apparatus part 16 and so that they are spaced apart from one another in the pivoting direction; these stops cooperate with counterpart stops 72 and 70 disposed on the other apparatus part and thereby limit the pivoting motion of the wiper blade in relation to the wiper arm. The stops—namely the inner surfaces 70—are disposed on the wiper arm with the aid of the clamp 60 while the counterpart stops, the band surfaces 72 of the spring strips 26, are disposed on the wiper blade 16. Because the spring strips 26 are disposed in a common plane spaced apart from the window surface 33, the tab-like extensions 62 of the clamp 60 are also disposed at a distance 67 from the window. So that the pivoting motion required for a proper wiper operation is possible (double arrow 42 in FIGS. 1 and 3), the distance 68 between the inner surfaces 70 of the tabs 62 oriented toward each other is greater than the distance 71 between the band surfaces or counterpart stop surfaces 72 of the wiper blade 16 provided on the wiper blade, between the tabs. Furthermore, in the placement of the securing device, care must be taken that the required maximal pivoting motion of the wiper blade is not impaired or limited on one side by one of the two tab-like extensions 62.

A simple mounting of the clamp 60 on the wiper arm 12 can be achieved by virtue of the fact that the clamp 60, as in the exemplary embodiment, is made of an elastic plastic so that by spreading apart the two U-arms 64 of the clamp 60, it can be clamped onto the wiper arm. This clamping motion can be encouraged by a detent projection 74 embodied in the form of a ramp. In order to secure the clamp 60 in the longitudinal direction of the wiper arm, the clamp must be provided with at least one securing shoulder, which points in the longitudinal direction of the wiper arm and cooperates with a counterpart shoulder of the wiper arm oriented toward it. In the exemplary embodiment, this is achieved by the fact that the one U-arm 64 of the clamp 60 is provided with a pin-like projection 76 which, when snapped into place, is inserted into a detent bore 78 of the wiper arm. As a result, the circumference surface of the projection 76 and the wall of the detent bore 78 constitute securing shoulders and counterpart shoulders that cooperate with one another.

When the clamp 60 is snapped onto the wiper arm 12, care must be taken that the band surfaces 72 of the spring strip 26 adjacent to the wiper arm are inserted between the tab-like extensions 62 of the clamp. In order to detach the wiper blade 16 from the wiper arm 12, for example the wiper blade can be rotated in relation to the wiper arm with a particular expenditure of force in a direction of the double arrow 42 so that one of the two tabs 62 is temporarily deflected elastically and the wiper blade is released for further removal motion. Naturally, the clamp 60 can also be removed from the wiper arm for this purpose.

What is claimed is:

1. A wiper apparatus for motor vehicle windows, having a wiper arm (12) that can be moved between reversal positions, is loaded toward the window (20), and constitutes a first apparatus part, whose free end can be connected to a wiper blade (16), which can oscillate around an axis (40) pointing essentially in the wiping direction (double arrow 38), constitutes a second apparatus part, and together with the wiper arm, can be moved lateral to the wiping direction, from its operating position into an installation position, and having means for limiting the oscillating motion, wherein the wiper blade (16) is disposed next to the wiper arm (12) when viewed from above and that at least one of the two apparatus parts (12 and 16) is provided with stops (70 and 72), which are disposed at a distance (68) from each other in the oscillating direction, extend toward the other apparatus part (16 and 12), and cooperate with counterpart stops (72 or 70) there, and thereby limit the oscillating motion (double arrow 42) of the wiper blade (16) in relation to the wiper arm (12) to a maximal amount of 45°, the stops (70) are disposed on the wiper arm (12) and the counterpart stops (72) are disposed on the wiper blade (16), two tabs (62) are disposed on the wiper arm (12), which extend toward the wiper blade (16), constitute the stops, and extend in the oscillation plane of the wiper blade at a distance (67) from the window and the distance (68) between the tab surfaces (70) oriented toward each other, measured perpendicular to the window (20), is greater than the distance between the counterpart stops (72) of the wiper blade, which are provided on the wiper blade, between the tabs.

2. The wiper apparatus according to claim 1, wherein spaced apart from the window (20) to be wiped, the wiper blade (16) is provided with a band-like, elongated, spring elastic support element (18), which is provided for a rubber elastic wiper strip (30) that can be placed against the window, characterized in that the support element (18) extends with a projection (34) beyond the width of the wiper strip (30), between the surfaces (70) of the tabs that are oriented toward each other and that the counterpart stops of the wiper blade are embodied on the projection.

3. The wiper apparatus according to claim 1, wherein the two tabs are constituted by extensions of the arm (64) of a clamp (60) with a U-shaped cross section which encompasses the wiper arm and is fastened to it.

4. The wiper apparatus according to claim 3, wherein the clamp (60) has at least one securing shoulder (76) pointing in the longitudinal direction of the wiper arm (12), which shoulder cooperates with a counterpart shoulder (78) of the wiper arm (12) that is oriented toward it.

5. The wiper apparatus according to claim 3, wherein the clamp (60) is made of an elastic plastic.

6. A wiper apparatus for motor vehicle windows, having a wiper arm (12) that can be moved between reversal positions, is loaded toward the window (20), and constitutes a first apparatus part, whose free end can be connected to a wiper blade (16), which can oscillate around an axis (40) pointing essentially in the wiping direction (double arrow 38), constitutes a second apparatus part, and together with the wiper arm, can be moved lateral to the wiping direction, from its operating position into an installation position, and having means for limiting the oscillating motion, wherein the wiper blade (16) is disposed next to the wiper arm (12) when viewed from above and that at least one of the two apparatus parts (12 and 16) is provided with stops (70 and 72), which are disposed at a distance (68) from each other in the oscillating direction, extend toward the other apparatus part (16 and 12), and cooperate with counterpart stops (72 or 70) there, and thereby limit the oscillating motion (double arrow 42) of the wiper blade (16) in relation to the wiper arm (12) to a maximal amount of 45°, wherein two bearing pins (44), which belong to a hinge joint (40), protrude from the longitudinal sides of the wiper blade (16), are not round in cross section, and are guided in recesses (46) of the wiper arm (12) that are open at an edge.

* * * * *